United States Patent Office 3,505,186
Patented Apr. 7, 1970

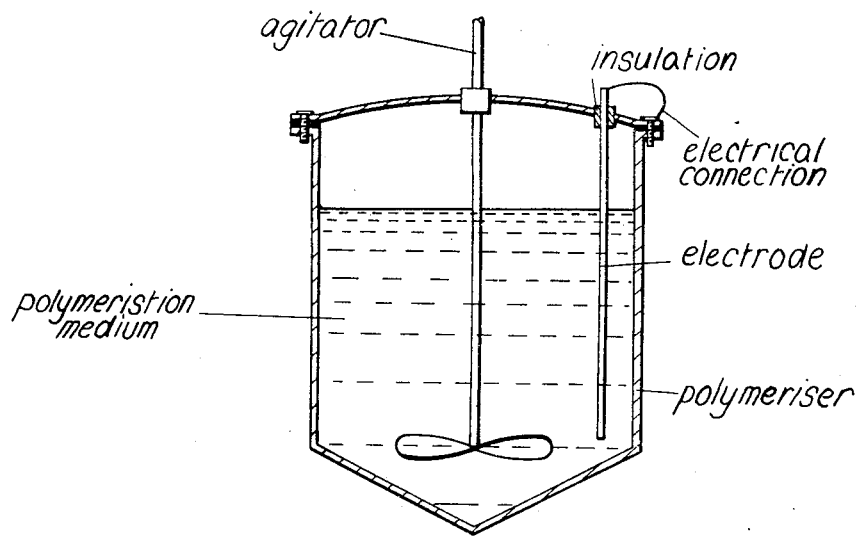

3,505,186
PROCESS FOR OBTAINING POLYMERS BASED
ON ACRYLONITRILE
Dominique Sarazin and Boris Trifilieff, Colmar, Haut-Rhin, France, assignors to Crylor, Paris, France, a French body corporate
Filed Apr. 28, 1967, Ser. No. 634,570
Claims priority, application France, May 3, 1966, 60,101
Int. Cl. B01k 1/00
U.S. Cl. 204—73
8 Claims

ABSTRACT OF THE DISCLOSURE

In polymerisation and copolymerisation of acrylonitrile in a reactor of a ferrous metal, the deposition of a crust of polymerised material on the reactor wall is reduced, localised or eliminated by providing one or more electrodes of an electropositive metal having one oxidation state only, especially aluminum, zinc or magnesium, which extend into the polymerisation medium, are kept at a potential positive with respect to the metal of the reactor in the polymerisation medium, optionally with the aid of an applied voltage, and are connected to the body of the reactor solely by a circuit outside the reaction medium.

---

The invention relates to a process for polymerising acrylonitrile, by itself or mixed with one or more other copolymerisable monomers, in a polymerisation vessel (polymeriser) made of ferrous metal.

It is known to polymerise acrylonitrile, by itself or with other copolymerisable monomers, in an aqueous medium. Polymerisers made of ferrous metal are generally used for this purpose, and the operation takes place continuously. However, such polymerisers quickly become covered with a hard and horny crust of a polymer, which makes it difficult for the reaction medium to be cooled by a refrigerating jacket, and this necessitates the frequent stopping of the polymerisation to remove the crust from the polymeriser. In addition, it frequently happens that a film of "crust" becomes detached and mixed with the normal polymer, and this may give rise to heterogeneities in the subsequent use of the polymer.

It has been proposed to avoid this formation of "crusts" on the walls of polymerisers by carrying out the polymerisation in the presence of a volatile amine, ammonia, or a compound liberating the same, but such a process cannot be used with an aqueous medium.

It is an object of the present invention to provide an improved polymerisation process in which their crust formation is reduced or prevented.

In one aspect the invention comprises a process for obtaining a polymer containing 50–100% by weight of acrylonitrile units and 0–50% by weight of units originating from at least one other ethylenic monomer copolymerisable with acrylonitrile by polymerisation in an aqueous medium in a polymeriser made of ferrous metal, in which the polymerisation is effected in the presence of at least one electrode which is in contact with the polymerisation medium and is electrically connected to the body of the polymeriser solely by a circuit outside this medium, the electrode being formed of a metal whose potential, in the polymerisation medium, is positive with respect to the metal of the polymeriser so that the electrode functions as a soluble anode the metal of which is sufficiently electro-positive to dissolve in the polymerisation medium, releasing a gas, immediately after it has been deposited on the walls of the polymeriser, and which exists in only a single degree of oxidation.

Monomers which can be copolymerised with acrylonitrile include the vinyl compounds, for example vinyl chloride and vinyl acetate; vinylidene chloride; acrylic and methacrylic acids and their esters, amides and other derivatives, e.g. methyl acrylate and methacrylate and methacrylonitrile; vinyl-sulphonic compounds such as sulphonated aromatic derivatives, e.g. styrene-sulphonic acid, vinyl-oxyarylene sulphonic acids, acryloxyalkoxyarylene sulphonic acids, and their derivatives, for example their salts; and vinyl derivatives of a basic type, such as vinyl-pyridine and its alkyl derivatives; and vinyl aminoalkyl ethers.

The polymerisation is carried out in an aqueous medium, normally in the presence of a catalyst of the redox type, employing for example a persulphate, chlorate or chlorite or hydrogen peroxide as the oxidising component and sulphurous or hydrosulphurous acid, a bisulphite or hydrosulphite, or sulphur dioxide as reducing component.

The polymerisation can be effected with all the monomer in solution, or in the presence of excess monomer, which dissolves as the monomer in the solution is removed by the polymerisation.

The positive potential of the metal of the electrode, with respect to the metal of the polymeriser can either be inherein, in which case a positive potential difference is established spontaneously in the electric connecting circuit between the electrode and the polymeriser, or it can be created artificially by imposing a voltage difference in the said circuit or both. In all three cases the electrode functions as a soluble anode, liberating metal ions which move towards the walls of the polymeriser which act as cathode.

The discharge potential of the metal ion originating from the electrode on the metal of the polymeriser must be low. The phenomenon of overvoltage at the surface of the polymeriser must in particular be reduced as much as possible by regular agitation of the contents of the polymeriser. Under these conditions, the metal is deposited in a very divided state on the wall of the polymeriser.

This metal, deposited on the wall, is sufficiently electropositive or sufficiently reducing for it to dissolve again in the polymerisation medium with liberation of hydrogen. The gas layer or cushion thus formed is essential if the formation of a crust is to be prevented, mere solution of the metal of the polymeriser or of the deposited metal being in itself insufficient.

If the metal can exist in two or more degrees of oxidation, electron exchange between the oxidised form and the reduced form can take place at the surface of the polymeriser to the benefit of the metal deposit, which would then not be able to prevent crust formation.

It is generally advantageous to use an electrode formed of a metal whose oxide-reduction potential in the polymerisation medium is more negative than that of the metal of the polymeriser. This permits selective solution of the metal deposited in a very finely divided state.

Among the metals which can be used for the electrode are, for example zinc, aluminum and magnesium and alloys of these metals, such as alloys of aluminum and tin, aluminum and titanium and even quaternary alloys such as aluminum/tin/copper/nickel. In practice, it is generally preferred to use aluminum, for both economic and technical reasons. This metal dissolves more slowly in the polymerisation medium than zinc or magnesium and as a consequence leads to a purer polymer; this can be important, since the presence of metallic impurities in the polymer can substantially modify its characteristics.

The dimensions and the number of electrodes can vary within wide limits, depending on the effect which is desired. For example, if it is desired to prevent completely the deposit of crusts on the walls of the polymeriser, it is generally advantageous to use a ratio between electrode surface and polymeriser surface in the region of 3% or higher. It is moreover generally advantageous to position the said electrode or electrodes fairly close to the walls of the polymeriser in order to obtain maximum efficiency. If, for reasons of convenience, for example to prevent the polymeriser being too greatly encumbered by the electrodes, it is preferred to use only a single electrode which is insufficient to prevent completely the formation of a crust, it will be advantageous to position said electrode very close to the wall of the polymeriser, so as to prevent completely the formation of crusts, but only on the small surface of the wall which is close to the electrode. Since even a thin polymer crust provides good thermal insulation and the reaction medium is strongly agitated, it may be preferable to keep quite clean a small wall surface which in practice will permit sufficient thermal exchange to increase considerably the time between stoppages, rather than merely to reduce the thickness of the crust formed over the entire polymeriser, by using an electrode spaced further from the wall.

The following examples, in which the parts are by weight, illustrate the invention. To facilitate comparison, the deposition of crust is expressed in grams per hour per square metre; this figure was obtained by dividing the total weight of the crust formed by the number of operating hours and by the effective surface of the polymeriser. Specific viscosities are measured on a solution in dimethyl formamide containing 2 grams per litre of polymer at 20° C.

EXAMPLE 1

A polymeriser with a capacity of 6 litres and made of stainless steel (containing 18% of chromium, 8% of nickel and 2.5% of molybdenum) is used, to the cover of which is fixed a cylindrical aluminium electrode with a length of 23 cm. and an external diameter of 8 mm., giving a ratio between electrode surface and polymeriser surface of 3.2%. This electrode is placed 2 cm. from the wall of the polymeriser, and is insulated electrically from the cover by means of a rubber ring. It is connected externally to the body of the polymeriser by means of an electric conductor.

189.4 parts of pure acrylonitrile, 8.8 parts of pure methyl methacrylate, 1.8 parts of potassium salt of a vinyl-oxybenzene sulphonic acid, 796.9 parts of demineralised water and, as catalyst, a redox system composed of 2.4 parts of sodium bisulphite and 0.7 part of potassium chlorate are continuously introduced into the polymeriser at the rate of 4 litres per hour. The polymerisation is carried out with constant agitation, the polymerisation medium being at a temperature of 60° C. and at a constant pH value of 2.5. During the polymerisation, the potential difference between the electrode and the polymeriser is 190 millivolts.

The polymer suspension formed is withdrawn continuously by overflow, and from it a copolymer is obtained which has a specific viscosity of 0.381.

After polymerising for 36 hours, the loss in weight of the electrode is practically zero and the crust formation is extremely small. If the polymerisation takes place under the same conditions without an electrode, it is found that a crust is deposited on the wall of the polymeriser at a rate of 5.3 g. per hour per square metre.

EXAMPLE 2

The same polymeriser as in Example 1 is used, and also a cylindrical electrode situated at the same distance from the wall of the polymeriser, but formed of an alloy containing 80% of aluminium and 20% of tin.

136.6 parts of pure acrylonitrile, 58.6 parts of vinylidene chloride, 4.8 parts of potassium salt of vinyl-oxybenzene-sulphonic acid, 797.8 parts of demineralised water and, as catalyst, a redox system composed of 1.65 parts of sodium bisulphite and 0.55 part of potassium chlorate, are continuously introduced into the polymeriser at the rate of 3 litres per hour. The polymerisation medium is at a temperature of 40° C. and kept at a constant pH value of 2.6. The polymerisation is continued with constant agitation for 24 hours, the potential difference between the electrode and the polymeriser being 330 millivolts. The polymer suspension formed is withdrawn by overflow, and from it a copolymer is obtained which has a specific viscosity of 0.381.

The loss in weight of the electrode is 1 g. per hour per square metre and very little crust is formed. Without an electrode, and polymerising under the same conditions, it is found that a crust is deposited at a rate of 5.7 g. per hour per square metre.

EXAMPLE 3

A 50 litre polymeriser is used, to whose cover 3 cylindrical aluminium electrodes 45 cm. long and 122 mm. in external diameter are fixed, giving a ratio between the surface of the electrodes and the surface of the polymeriser of 7.8%. The electrodes are placed 5 cm. from the wall of the polymeriser, insulated from the cover by means of a rubber ring, and connected externally to the body of the polymeriser by means of an electric conductor.

236.1 parts of pure acrylonitrile, 13.9 parts of pure methyl acrylate, 746.35 parts of demineralised water and, as catalyst, a redox system comprising 2.8 parts of sodium bisulphite and 0.85 part of potassium chlorate are continuously introduced into the polymeriser at the rate of about 33.3 litres per hour. The polymerisation is carried out with constant agitation, the polymerisation medium being kept at a temperature of 60° C. and at a pH value of 2.5. The polymerisation is continued for 15 hours. The copolymer is continuously drawn off by overflow of the polymer suspension formed. It has a specific viscosity of 0.391. The loss in weight of the electrodes is 11 g. per hour per square metre, and no crust is formed. In a similar polymerisation without the electrode a crust is deposited on the polymeriser walls at a rate of 3 g. per hour per square metre.

EXAMPLE 4

The polymeriser of Example 3 is used, except that the external diameter of the electrodes is 22 mm., giving a ratio between the surface of the electrodes and the polymeriser surface of 11.5%, and that the electrodes are positioned 4.5 cm. from the wall of the polymeriser. 189.4 parts of pure acrylonitrile, 8.8 parts of methyl methacrylate, 1.8 parts of potassium salt of vinyl-oxybenzenesulphonic acid, 796.9 parts of demineralised water and, as catalyst, a redox system composed of 2.4 parts of sodium bisulphite and 0.7 part of potassium chlorate are continuously introduced into the polymeriser at 33.3 litres per hour; the polymerisation medium is kept at a constant pH value of 2.5 and at a temperature of 60° C. The potential difference between each electrode and the body of the polymeriser is 240 millivolts.

The polymerisation is continued for 96 hours while agitating and the polymer is drawn off in the same manner as in the previous examples. The copolymer which is obtained has a specific viscosity of about 0.415. Crust formation is practically zero. If the polymerisation is carried out under the same conditions without an electrode, crust is deposited at the rate of 5.5 g. per hour per square metre.

EXAMPLE 5

Exactly the same installation as in Example 1 is used, except that the electrode consists of magnesium (oxido-reduction potential—2.37).

The same quantities of the same materials as in Example 1 are introduced into the polymeriser at the rate of 4 litres per hour. The potential difference between the electrode and the body of the polymeriser is 1400 millivolts. A polymer with a specific viscosity of 0.384 is continuously drawn off. After operating for 36 hours, the polymeriser carries only a fine skin of uniform crust, whereas the same operation, carried out in the absence of an electrode, causes a deposit of 5.3 g. per hour per square metre on the walls.

EXAMPLE 6

The same installation as in Example 1 is used, except that the electrode consists of zinc (oxido-reduction potential—0.763), and is 180 mm. long and 10 mm. in external diameter, giving a ratio between electrode surface and polymeriser surface of 4.2%.

The polymerisation is effected continuously, using the same quantities of the same monomers and the same catalyst as in Example 1. The potential difference between the electrode and the polymeriser is 620 millivolts. The polymer which is drawn off has a specific viscosity of about 0.372. After operation for 36 hours, the loss in weight of the electrode is 66.5 g. per hour per square metre and no crust is formed.

EXAMPLE 7

The polymerisation takes place in exactly the same manner as in Example 1, except that two electrodes are used, consisting of an alloy containing 91% of aluminium, 6% of tin, 1.5% of copper and 0.75% of nickel; the electrodes have the same dimensions giving a ratio between the surface of the electrodes and the polymeriser surface of 6.4%. The same products are introduced in identical quantities into the polymeriser. A copolymer of specific viscosity 0.400 is withdrawn. After polymerising for 36 hours, the loss in weight of the electrodes is 3.6 g. per hour per square metre, and no crust has formed.

EXAMPLE 8

The polymerisation is carried out in an apparatus of the same dimensions as in Example 3, provided with the same number of electrodes of identical size and shape, also situated at 5 cm. from the wall of the polymeriser.

The same quantities of the same materials as those used in Example 4 are continuously introduced into the polymeriser at the rate of 33.3 litres per hour, the polymerisation medium being kept at a temperature of 60° C. and at a constant pH value of 2.5. The potential difference between one of the electrodes and the polymeriser is 170 millivolts. The polymerisation is continued for 96 hours. The polymer is collected as before; it has a specific viscosity of 0.410. No crust is formed in the vicinity of the electrodes, and crust formation is greatly reduced elsewhere. Without an electrode and for the same polymerisation period, the crust formation is 5.5 g. per hour per square metre.

EXAMPLE 9

A 6 litre polymeriser is used, to whose cover are fixed two cylindrical aluminium electrodes of length 23 cm. and external diameter 8 mm., giving a ratio between electrode surface and polymeriser surface of 6.4%. The electrodes are fixed as described in Example 1.

142.3 parts of pure acrylonitrile, 7.7 parts of methyl methacrylate, 847.6 parts of demineralised water and, as catalyst, a redox system comprising 1.8 parts of sodium bisulphite and 0.55 part of potassium chlorate are introduced into the polymeriser at the rate of 3 litres per hour. The polymerisation is conducted in the usual way, the polymerisation medium being adjusted to a constant pH value of 2.5 by means of 0.05 part of sulphuric acid. Polymerisation is continued at 50° C. for 36 hours, with a complete absence of crust formation on the walls. Without an electrode, 2.4 g. per hour per square metre of crust is deposited.

EXAMPLE 10

The polymerisation and electrodes of Example 9 are used. 189.4 parts of pure acrylonitrile, 8.8 parts of methyl methacrylate, 1.8 parts of potassium salt of vinyl-oxy-benzene-sulphonic acid, 796.35 parts of demineralised water and, as catalyst, a redox system composed of 2.35 parts of sodium bisulphite and 0.65 part of potassium persulphate are introduced into the polymeriser at the rate of 4 litres per hour. The polymerisation is carried out with constant agitation at a temperature of 60° C., the polymerisation medium being adjusted to a pH value of 3.2 by means of 0.65 part of sulphuric acid.

The polymerisation is continued for 36 hours with a complete absence of crust formation; which crust formation, in the absence of an electrode, is about 5 g. per hour per square metre.

EXAMPLE 11

The polymeriser and electrodes of Example 9 are used.

236.1 parts of pure acrylonitrile, 13.9 parts of methyl methacrylate, 746.35 parts of demineralised water and, as catalyst, 2.8 parts of sodium bisulphite and 0.85 part of potassium chlorate are introduced into the polymeriser. The polymerisation takes place at 50° C., the polymerisation medium being kept at a constant pH value of 2.5.

The polymerisation is continued for 3 hours; no crust formation occurs, whereas without an electrode; 3.1 g. per hour per square metre of crust is deposited.

EXAMPLE 12

The polymeriser and electrodes of Example 9 are used, except that the electrodes are formed of an alloy containing 99.7% of aluminium and 0.3% of titanium.

136.6 parts of pure acrylonitrile, 58.6 parts of vinylidene chloride, 4.8 parts of potassium salt of vinyloxy-benzene-sulphonic acid, 797.8 parts of demineralised water and, as redox system, 1.65 parts of sodium bisulphite and 0.55 part of potassium chlorate are introduced into the polymeriser at the rate of 3 litres per hour. The polymerisation medium is kept at a constant pH value of 2.6 and a temperature of 40° C. Polymerisation is continued for 36 hours.

No crust is formed. Without an electrode, 5.7 g. per hour per square metre of crust is deposited on the walls of the polymeriser.

EXAMPLE 13

Example 1 is repeated, except that a battery is included in the connection circuit between electrode and polymeriser, the positive terminal of the battery being connected to the electrode and the voltage imposed being 1300 millivolts.

During 36 hours of polymerisation, 2.8 g. per hour per square metre of crust is deposited on the walls of the polymeriser. Without an electrode 5.3 g. per hour per square metre is deposited.

EXAMPLE 14

Using a polymeriser and electrodes identical with those of Example 9, 250 parts of acrylonitrile, 745.4 parts of demineralised water, 4.45 parts of sodium bisulphite, 1 part of potassium chlorate and 0.15 part of sulphuric acid are introduced at the rate of 4 litres per hour.

The polymerisation is carried out for 36 hours at a temperature of 60° C. No crust is deposited.

EXAMPLE 15

Using a polymeriser and electrodes identical with that of Example 9, the following are introduced at the rate of 3 litres per hour; 175.95 parts of acrylonitrile, 10.25 parts of methyl methacrylate, 13.8 parts of methyl vinyl pyridine, 791.65 parts of demineralised water, 1.55 parts of sodium bisulphite, 0.50 part of potassium chlorate, 4.60 parts of nitric acid and 1.70 parts of sodium nitrate.

The polymerisation is carried out for 36 hours at 50° C. No crust is deposited.

EXAMPLE 16

Example 1 is repeated, except that an electrode formed of 95% of aluminium and 5% of tin is used.

The same results are obtained.

We claim:

1. A process for obtaining a polymer containing 50–100% by weight of acrylonitrile units and 0–50% by weight of units originating from at least one ethylenic monomer copolymerisable with acrylonitrile, by polymerisation in an aqueous medium in a polymeriser made of ferrous metal, in which the polymerisation is effected in the presence of at least one electrode which is in contact with the polymerisation medium and is connected electrically to the body of the polymeriser solely by a circuit outside this medium, the electrode being formed of a metal whose potential, in the polymerisation medium, is positive with respect to the metal of the polymeriser, which is sufficiently electro-positive to dissolve in the polymerisation medium, releasing a gas, immediately after it has been deposited on the walls of the polymeriser, and which exists in only a single degree of oxidation.

2. A process according to claim 1, in which the polymerisation is effected in the presence of at least one electrode of a metal selected from the group which consists of aluminium and aluminium alloys, zinc and zinc alloys, and magnesium and magnesium alloys.

3. A process according to claim 1, in which the potential difference between the electrode and the body of the polymeriser is due, at least in part, to an applied voltage.

4. A process according to claim 2, in which the potential difference between the electrode and the body of the polymeriser is due, at least in part, to an applied voltage.

5. A process according to claim 1, in which the ratio between the electrode surface and the surface of the polymeriser is at least 3%.

6. A process according to claim 2, in which the ratio between the electrode surface and the surface of the polymeriser is at least 3%.

7. A process according to claim 1, in which the electrode is situated sufficiently close to the wall of the polymeriser, and the reaction medium is sufficiently vigorously agitated, to keep at least an area of the wall in the vicinity of the electrode completely free from deposited polymer crust.

8. A process according to claim 6, in which the electrode is situated sufficiently close to the wall of the polymeriser, and the reaction medium is sufficiently vigorously agitated, to keep at least an area of the wall in the vicinity of the electrode completely free from deposited polymer crust.

References Cited

UNITED STATES PATENTS

| | | | |
|---|---|---|---|
| 3,193,481 | 7/1965 | Baizer | 204—73 |
| 3,375,237 | 3/1968 | Baizer | 204—73 X |
| 3,402,112 | 9/1968 | Brubaker et al. | 204—74 |

DANIEL E. WYMAN, Primary Examiner

C. F. DEES, Assistant Examiner

U.S. Cl. X.R.

204—165